US007193968B1

(12) United States Patent
Kapoor et al.

(10) Patent No.: US 7,193,968 B1
(45) Date of Patent: Mar. 20, 2007

(54) SAMPLE NETFLOW FOR NETWORK TRAFFIC DATA COLLECTION

(75) Inventors: Ruchi D. Kapoor, Sunnyvale, CA (US); Angelo D. Calabrese, Daly City, CA (US); Rakesh K. Dubey, Fremont, CA (US); Charles I. Goldberg, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 781 days.

(21) Appl. No.: 09/779,248

(22) Filed: Feb. 8, 2001

(51) Int. Cl.
*G01R 31/08* (2006.01)
*H04L 12/28* (2006.01)

(52) U.S. Cl. .................. 370/235; 370/252; 370/389

(58) Field of Classification Search ............ 370/395.3, 370/395.31, 395.5, 395.52, 230, 428, 429, 370/419, 235, 359, 381, 389, 392, 149, 395.34; 711/203–209, 211; 709/238–244
See application file for complete search history.

(56) References Cited

U.S. PATENT DOCUMENTS

| | | | | |
|---|---|---|---|---|
| 5,488,608 | A * | 1/1996 | Flammer, III | 370/400 |
| 5,539,659 | A * | 7/1996 | McKee et al. | 709/224 |
| 5,822,535 | A * | 10/1998 | Takase et al. | 709/226 |
| 5,872,783 | A * | 2/1999 | Chin | 370/395.32 |
| 5,884,080 | A * | 3/1999 | Blandy et al. | 717/130 |
| 5,936,940 | A * | 8/1999 | Marin et al. | 370/232 |
| 6,160,811 | A * | 12/2000 | Partridge et al. | 370/401 |
| 6,247,058 | B1 * | 6/2001 | Miller et al. | 709/234 |
| 6,289,013 | B1 * | 9/2001 | Lakshman et al. | 370/389 |
| 6,434,144 | B1 * | 8/2002 | Romanov | 370/392 |
| 6,463,067 | B1 * | 10/2002 | Hebb et al. | 370/413 |
| 6,570,875 | B1 * | 5/2003 | Hegde | 370/389 |
| 6,594,704 | B1 * | 7/2003 | Birenback et al. | 709/238 |
| 6,651,099 | B1 * | 11/2003 | Dietz et al. | 709/224 |

(Continued)

FOREIGN PATENT DOCUMENTS

EP          837578 A2 *  4/1998

OTHER PUBLICATIONS

Cisco System White Paper, NetFlow Services and Applications, 1999, Cisco Systems, pp. 1-27.*

*Primary Examiner*—Doris H. To
*Assistant Examiner*—Ian N. Moore
(74) *Attorney, Agent, or Firm*—Campbell Stephenson Ascolese LLP

(57) ABSTRACT

A new network traffic data collection technique is presented. A group of information is received, and a determination is made whether to process the group of information for network data collection according to a sample mode and a sample rate. If the determination is to process the group of information, the group of information is processed for network data collection. The group of information is forwarded according to its destination address. The group of information can be an IP packet and the sample mode can be, for example, one of linear, exponential, natural log, burst and traffic attribute. To process the group of information, a determination is made whether the group of information is part of one or more recorded traffic flows. If not, a new entry in a table is created. If so, a field in an existing entry in the table is incremented. In addition, a traffic information packet is created and transmitted to a network traffic data collection application. The traffic information packet can consist of a header and one or more flow records.

31 Claims, 7 Drawing Sheets

U.S. PATENT DOCUMENTS

| | | | |
|---|---|---|---|
| 6,658,006 B1 * | 12/2003 | Chen et al. | 370/395.1 |
| 6,675,209 B1 * | 1/2004 | Britt | 709/224 |
| 6,731,631 B1 * | 5/2004 | Chang et al. | 370/388 |
| 6,738,352 B1 * | 5/2004 | Yamada et al. | 370/238 |
| 6,763,007 B1 * | 7/2004 | La Porta et al. | 370/331 |
| 6,894,972 B1 * | 5/2005 | Phaal | 370/229 |
| 6,990,103 B1 * | 1/2006 | Gollamudi | 370/395.31 |
| 2002/0026560 A1 * | 2/2002 | Jordan et al. | 711/120 |
| 2003/0037042 A1 * | 2/2003 | Kametani | 707/3 |
| 2005/0190695 A1 * | 9/2005 | Phaal | 370/229 |

* cited by examiner

| VERSION 310 | IHL 311 | TYPE-OF-SERVICE 312 | TOTAL LENGTH 313 | |
|---|---|---|---|---|
| IDENTIFICATION 320 | | | FLAGS 321 | FRAGMENT OFFSET 322 |
| TIME-TO-LIVE 330 | | PROTOCOL 331 | HEADER CHECKSUM 332 | |
| SOURCE ADDRESS 340 | | | | |
| DESTINATION ADDRESS 350 | | | | |
| OPTIONS + PADDING 360 | | | | |
| DATA 370 | | | | |

*FIG. 3*

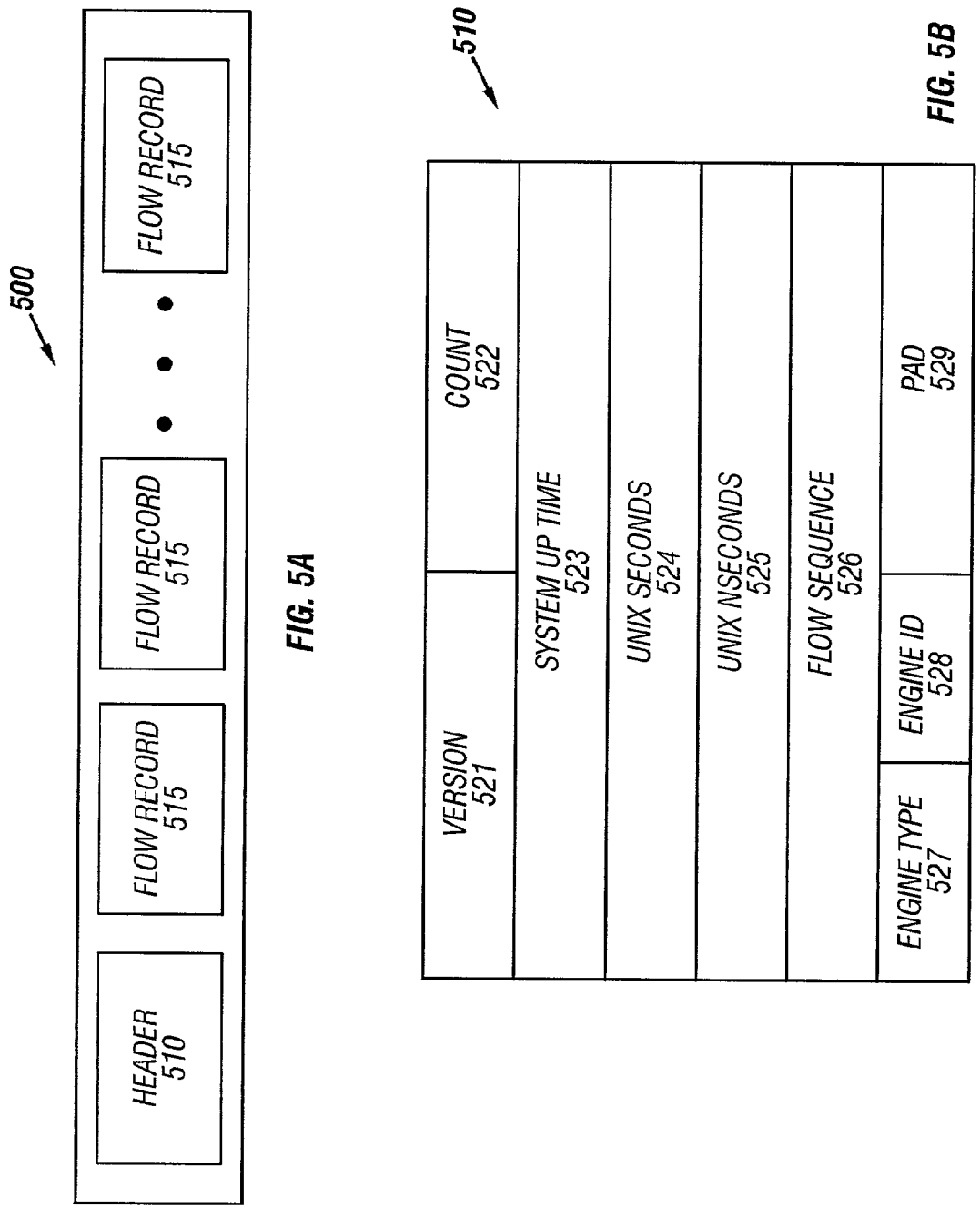

| SOURCE IP ADDRESS 531 | |
|---|---|
| DESTINATION IP ADDRESS 532 | |
| NEXT HOP 533 | |
| INPUT 534 | OUTPUT 535 |
| NUMBER OF PACKETS 536 | |
| NUMBER OF LAYER 3 BYTES 537 | |
| FIRST 538 | |
| LAST 539 | |
| SOURCE PORT 540 | DEST. PORT 541 |
| PAD 542 | TCP FLAGS 543 | PROTOCOL 544 | TOS 545 |
| SOURCE AS 546 | DEST. AS 547 |
| SOURCE MASK 548 | DEST. MASK 549 | PAD 550 |

| SAMPLING MODE 610 | SAMPLING INTERVAL 615 |
|---|---|

FIG. 6

SAMPLE NETFLOW FOR NETWORK TRAFFIC DATA COLLECTION

BACKGROUND OF THE INVENTION

1. Field of the Invention

This invention relates generally to network management and more particularly to network monitoring applications.

2. Description of the Related Art

The global computer network, known in one form as the "Internet," has become an important instrument for commerce, entertainment, communication, and information retrieval. Network-enabled intranet applications and powerful desktop computers have resulted in a significant increase in network traffic. The increase in network traffic has resulted in increases in demand for network bandwidth, performance, and predictable quality of service as well as multimedia and security oriented network services.

To support the increasing growth in network traffic, managing communications equipment has become increasingly important. Network management applications, such as NetFlow services and applications from Cisco Systems, Inc. of San Jose, Calif., provide measurement technology by efficiently providing the information required to record network and application resource utilization. Network management includes network traffic accounting, usage-based network billing, network planning, network monitoring, outbound marketing and data mining capabilities for both service provider and enterprise customers. The International Organization for Standardization (ISO) has partitioned network management activities into five major areas (also known as FCAPS, for the initials of each functional area): fault management, configuration management, accounting management, performance management, and security management.

These network management activities require the collection of data from communications equipment or network nodes. The Internet consists of a large installed base of many types of switches, routers, and other communications equipment and software employing multiple communications protocols. Among these protocols is the well-known Internet Protocol (IP), which is a connectionless communications protocol that provides, among other things, transport services for packetized data. Collecting network data typically requires, for example, that every IP packet (also referred to as "IP datagram") being forwarded by a router or other communications equipment must also be processed by the communications equipment's one or more processing engines. Thus, enabling network monitoring often reduces the throughput of the communications equipment, for example, reducing the number of IP packets being forwarded because processing every IP packet with the one or more processing engines to collect network data adds significant overhead to the functions the processing engine(s) must perform causing the processing engine(s) to become a bottleneck. The additional overhead on the processing engine(s) often significantly reduces the forwarding rate of the communications equipment and occasionally causes equipment failure.

To prevent equipment malfunctions and reduced throughput, collecting the network data from communications equipment must often be discontinued, preventing the collection of valuable network management data. A method of collecting data is needed that does not reduce network operations or cause equipment malfunctions. In addition, a method is needed that is compatible with the installed network infrastructure.

SUMMARY OF THE INVENTION

A new network traffic data collection technique is presented. A group of information is received, and a determination is made whether to process the group of information for network data collection according to a sample mode and a sample rate. If the determination is to process the group of information, the group of information is processed for network data collection. The group of information is forwarded according to its destination address.

In one embodiment, the group of information can be an IP packet and the sample mode can be, for example, one of linear, exponential, natural log, burst and traffic attribute.

In another embodiment, to process the group of information, a determination is made whether the group of information is already recorded in a table. If not, a new entry in the table is created. If so, a field in the existing entry in the table is incremented.

In another embodiment, a traffic information packet is created and transmitted to a network traffic data collection application. The traffic information packet can consist of a header and one or more flow records.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 illustrates the format of an Internet Protocol (IP) packet.

FIGS. 5A–5C illustrate an exemplary traffic information packet format according to an embodiment of the invention.

FIG. 6 illustrates sampled network data fields according to an embodiment of the invention.

The use of the same reference symbols in different drawings indicates similar or identical items.

DETAILED DESCRIPTION OF THE DRAWINGS

Example Network Environment

Figure 1:
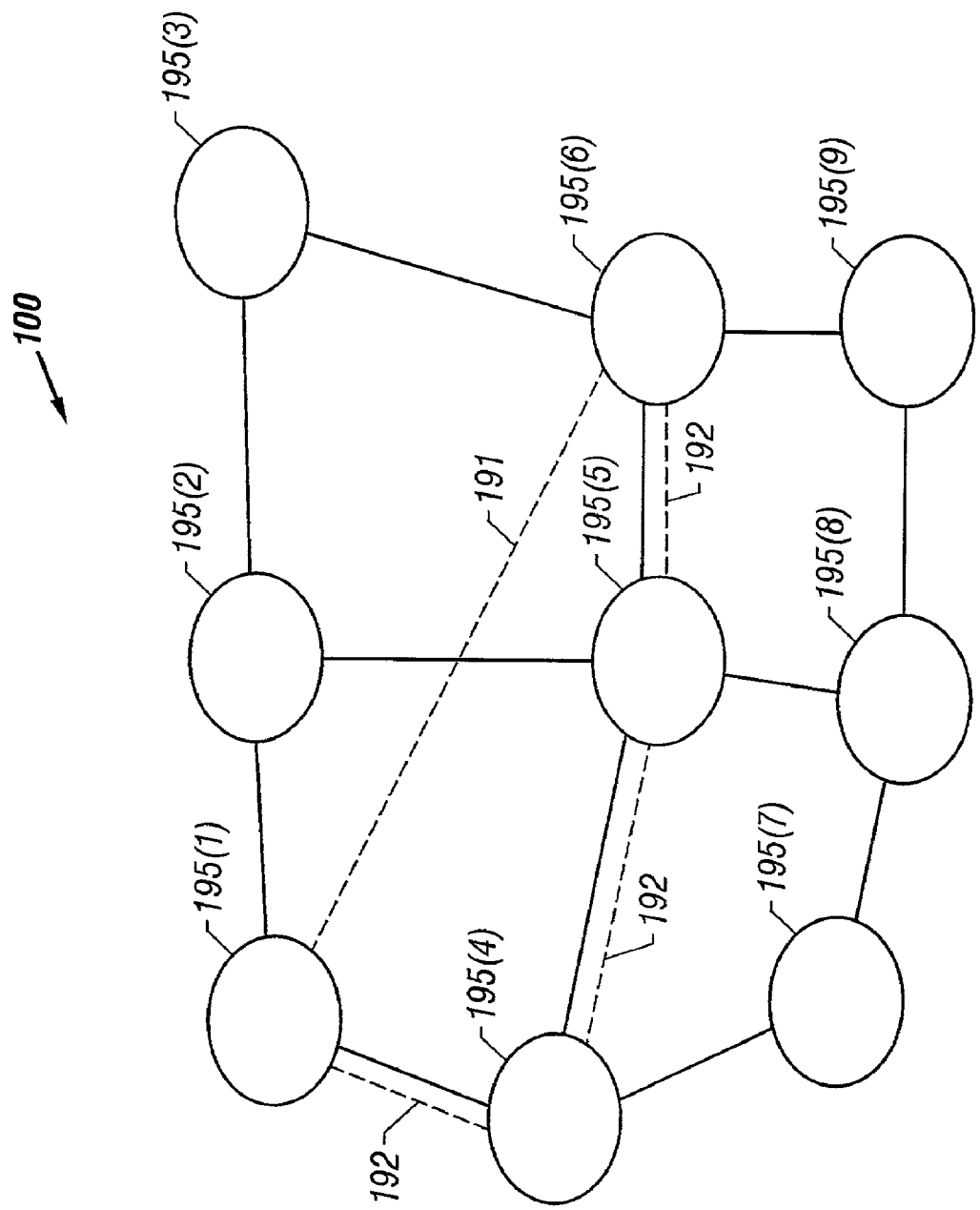
FIG. 1 illustrates a network environment in which embodiments of the present invention may be practiced.

FIG. 1 illustrates a network environment in which embodiments of the present invention may be practiced. Network 100 includes a number of nodes, network nodes 195 (1)–(N). One or more of network nodes 195(1)–(N) can be a router such as router 400, described in FIG. 4, or any other type of communications equipment such as a switch, bridge, or a hub. Network 100 can support the automatic provisioning, testing, restoration, and termination of virtual paths (exemplified by a virtual path 191) over a physical path (exemplified by a physical path 192) from one of network nodes 195(1)–(N) to another of network nodes 195(1)–(N). Physical path 192 may utilize fiber-optic cables or wireless technology, for example. While copper cabling may also be employed, such an option may not offer the speed and number of connections provided by an optical arrangement.

Figure 2:
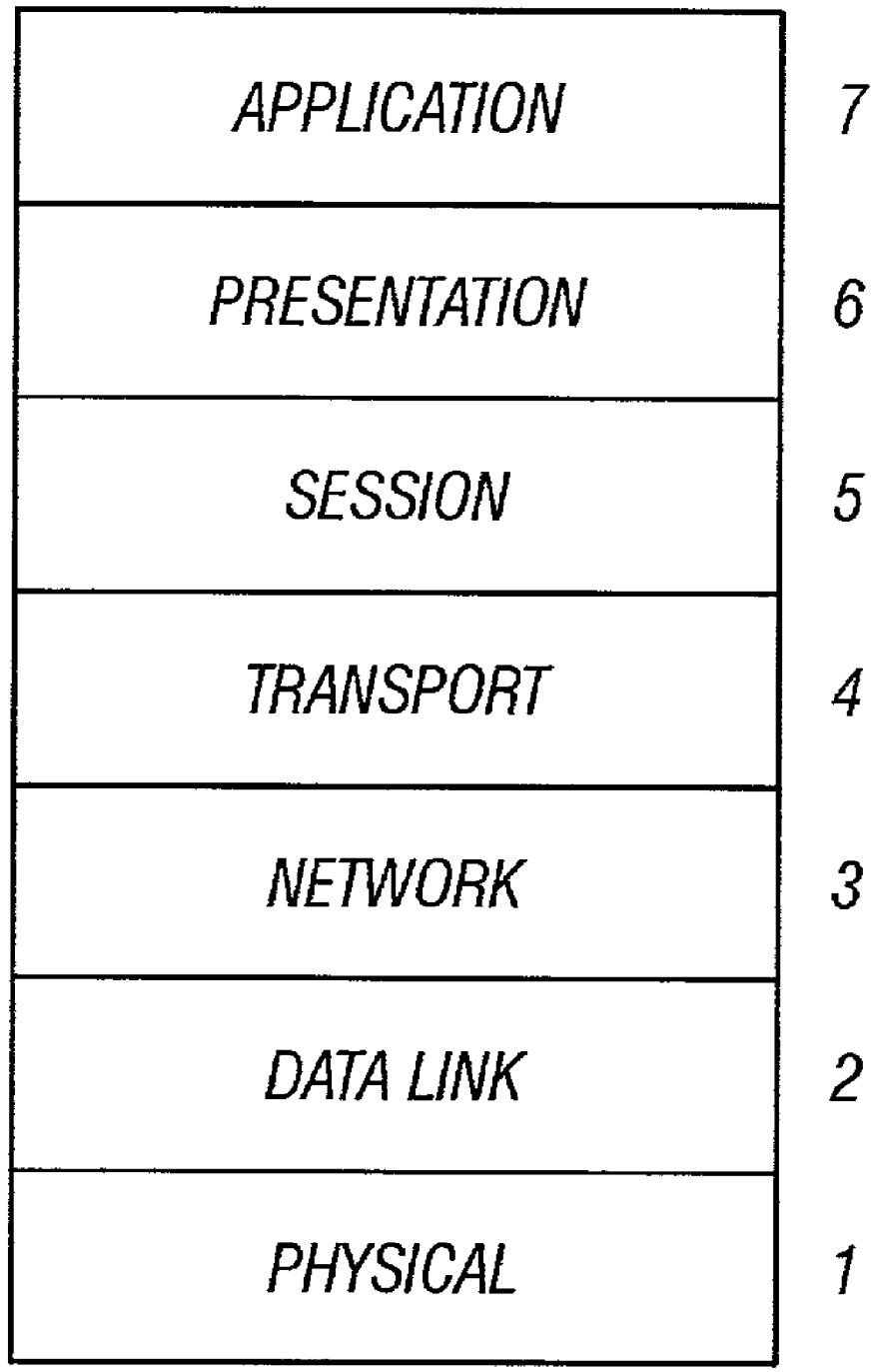
FIG. 2 illustrates the Open Systems Interconnection (OSI) protocol reference model.

FIG. 2 illustrates the Open Systems Interconnection (OSI) protocol reference model, a standard architectural model that is often used to describe a network communications protocol according to which a network transports packets of data. The OSI reference model separates the functions performed by communication protocols into manageable layers in a stack. Each layer performs a specific function in the process of communicating over a network. The OSI reference model consists of a seven layer protocol stack, each specifying particular network functions. Because each layer defines a function, each layer can contain multiple protocols, each of which provides a service suitable to the function of that layer.

Data is passed down the stack from one layer to the next, until the data is transmitted over the network by the network access layer protocols. At the remote end, the data is passed up the stack to the receiving application. Each layer in the stack adds control information (such as destination address, routing controls, and checksum) to ensure proper delivery. This control information is called a header and/or a trailer because it is placed in front of or behind the data to be transmitted. Each layer treats all of the information that it receives from the layer above it as data, and it places its own header and/or trailer around that information. These wrapped messages are then passed into the layer below along with additional control information, some of which may be forwarded or derived from the higher layer. By the time a message exits the system on a physical link (such as a wire), the original message is enveloped in multiple, nested "wrappers"—one for each layer of protocol through which the data passed. When data is received, the opposite happens. Each layer strips off its header and/or trailer before passing the data up to the layer above. As information flows back up the stack, information received from a lower layer is interpreted as both a header/trailer and data. This mechanism enables each layer in the transmitting node to communicate with its corresponding layer in the receiving node. Each layer in the transmitting computer communicates with its peer layer in the receiving computer via a process called peer-to-peer communication.

Referring to FIG. 2, Layer 7, the application layer, consists of applications programs that use the network. The application layer is the OSI layer closest to the end user, which means that both the OSI application layer and the user interact directly with the software application. This layer interacts with software applications that implement a communicating component. Application-layer functions typically include identifying communication partners, determining resource availability, and synchronizing communication.

Layer 6, the presentation layer, standardizes data presentation to the applications. The presentation layer provides a variety of coding and conversion functions that are applied to application layer data. These functions ensure that information sent from the application layer of one system will be readable by the application layer of another system.

Layer 5, the session layer, manages sessions between applications. The session layer establishes, manages, and terminates communication sessions between presentation layer entities. Communication sessions consist of service requests and service responses that occur between applications located in different network devices. These requests and responses are coordinated by protocols implemented at the session layer.

Layer 4, the transport layer, provides end-to-end error detection and correction. The transport layer implements reliable network data transport services that are transparent to upper layers. Transport-layer functions typically include flow control, multiplexing, virtual circuit management, and error checking and recovery. Network switches typically switch at layer 4.

Layer 3, the network layer, manages connections across the network for the upper layers. The network layer provides routing and related functions that enable multiple data links to be combined into a network. This is accomplished by the logical addressing (as opposed to the physical addressing) of devices. The network layer supports both connection-oriented and connectionless service from higher-layer protocols. Network-layer protocols typically are routing protocols, but other types of protocols are implemented at the network layer as well. Network routers typically switch at layer 3.

Layer 2, the data link layer, provides reliable data delivery across the physical link. The data link layer provides reliable transit of data across a physical network link. Different data link layer specifications define different network and protocol characteristics, including physical addressing, network topology, error notification, sequencing of frames, and flow control. Physical addressing (as opposed to network addressing) defines how devices are addressed at the data link layer. Network topology consists of the data-link layer specifications that often define how devices are to be physically connected, such as in a bus or a ring topology. Error notification alerts upper-layer protocols that a transmission error has occurred, and the sequencing of data frames reorders frames that are transmitted out of sequence. Finally, flow control moderates the transmission of data so that the receiving device is not overwhelmed with more traffic than it can handle at one time.

Layer 1, the physical layer, defines the physical characteristics of the network media. The physical layer defines the electrical, mechanical, procedural, and functional specifications for activating, maintaining, and deactivating the physical link between communicating network systems. Physical layer specifications define characteristics such as voltage levels, timing of voltage changes, physical data rates, maximum transmission distances, and physical connectors.

FIG. 3 illustrates the Internet Protocol (IP) packet format. The data and control information that is transmitted through networks takes a wide variety of forms. The terms used to refer to these groups of information or information formats are not used consistently in the networking industry but sometimes are used interchangeably. Information or data can be grouped into several common formats including frame, packet, datagram, segment, message, cell, and data unit. A frame is an information unit whose source and destination are data link layer entities. A packet is an information unit whose source and destination are network-layer entities. The term datagram usually refers to an information unit whose source and destination are network-layer entities that use connectionless network service. The term segment usually refers to an information unit whose source and destination are transport-layer entities. A message is an information unit whose source and destination entities exist above the network layer (often the application layer). A cell is an information unit of a fixed size whose source and destination are data-link layer entities. Data unit is a generic term that refers to a variety of information units.

The Internet Protocol (IP) is a network-layer protocol (Layer 3 of the OSI reference model) that contains addressing information and some control information that enables packets to be routed. IP is documented in Internet Request For Comments (RFC) 791 and is the primary network-layer protocol in the Internet protocol suite. Along with the Transmission Control Protocol (TCP), IP represents the heart of the Internet protocols.

Referring to FIG. 3, an IP packet is typically 32 bits wide and includes various control information fields. A version field 310 indicates the version of IP currently used. An IP header length (IHL) field 311 indicates the packet header length in 32-bit words. A type-of-service field 312 specifies how an upper-layer protocol would like a current packet to be handled, and assigns packets various levels of importance. A total length field 313 specifies the length, in bytes, of the entire IP packet, including the data and header. An identification field 320 contains an integer that identifies the current packet. Identification field 320 is used to help piece together packet fragments. A flags field 321 consists of a 3-bit field of which the two low-order (least-significant) bits control fragmentation. The low-order bit specifies whether the packet can be fragmented. The middle bit specifies whether the packet is the last fragment in a series of fragmented packets. The third or high-order bit is not used. A fragment offset field 322 indicates the position of the fragment's data relative to the beginning of the data in the original packet, which allows the destination IP process to properly reconstruct the original packet. A time-to-live field 330 maintains a counter that gradually decrements down to zero, at which point the packet is discarded. This keeps packets from looping endlessly. A protocol field 331 indicates which upper-layer protocol receives incoming packets after IP processing is complete. A header checksum field 332 helps ensure IP header integrity. A source address field 340 specifies the sending node. A destination address field 350 specifies the receiving node. An options and padding field 360 allows IP to support various options, such as security. A data field 370 contains upper-layer information, including the data to be transferred from one node to another. Data field 370 is a variable length field.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention that is defined in the claims following the description.

Figure 4:
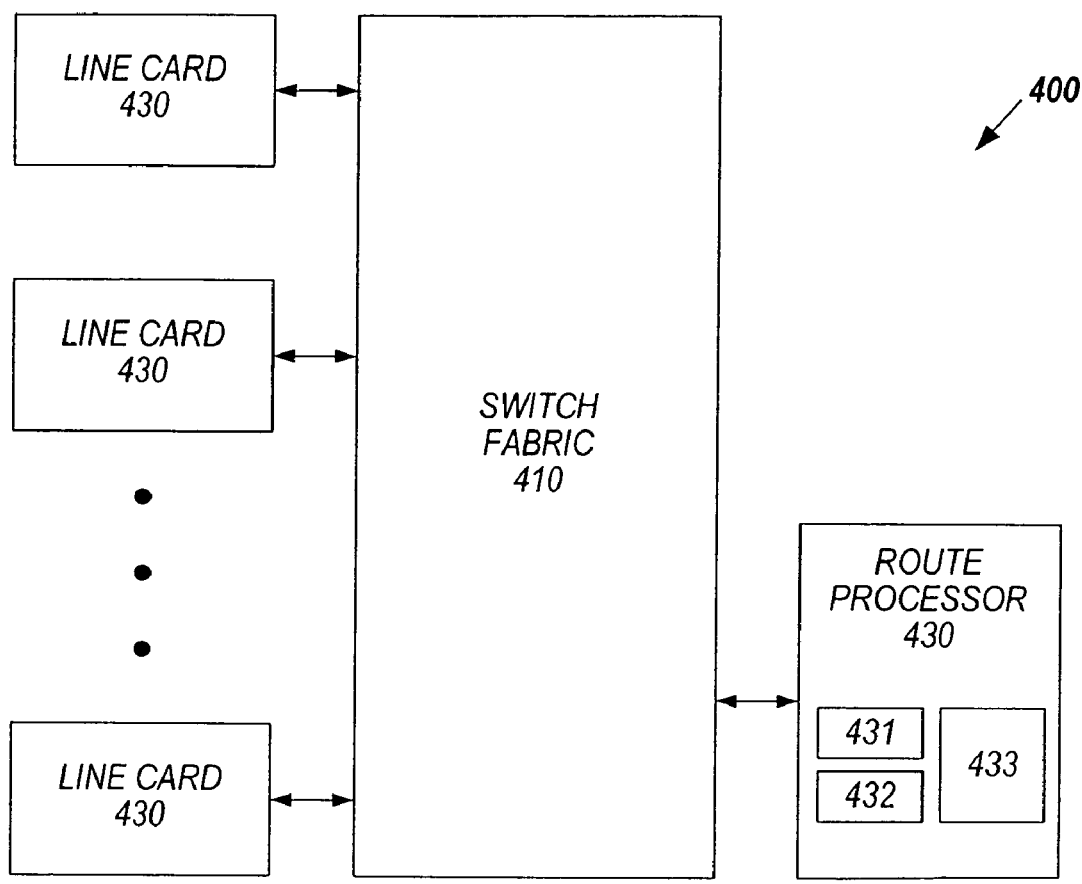
FIG. 4 illustrates a block diagram of an exemplary router.

FIG. 4 illustrates a block diagram showing selected components of a router, according to an embodiment of the invention. Routers typically switch at Layer 3 of the OSI reference model. Routers move information, such as IP packets, across a network from a source to a destination, typically through at least one intermediate node. A router is typically optimized for performing routing and packet-forwarding functions to transport IP packets across a network.

Referring to FIG. 4, the major components of typical router 400 include a switch fabric 410, a route processor 420 and one or more line cards 430. Switch fabric 410 handles requests from line cards, issues grants to access the fabric, provides a reference clock to devices in the system to synchronize data transfers. Switch fabric 410 also receives scheduling information and performs switching functions.

Route processor 420 is responsible for running the routing protocols and building routing tables from the network topology. The routing information is then used to build forwarding tables distributed to line cards 430. Route processor 420 determines the network topology, calculates the best path across the network, creates and maintains a routing table, distributes and updates forwarding tables on line cards 430 and maintains copies of the tables of each line card for card initialization. Route processor 420 is responsible for the system control and administrative functions and also handles general maintenance functions such as diagnostics, console support, and line card monitoring. Route processor 420 provides the routing intelligence for router 400. Route processor 420 typically includes Ethernet connections for network management access, one or more processing engines (431 and 432), and memory 433.

Line cards 430 perform the packet-forwarding functions. A copy of the forwarding tables computed by route processor 420 is distributed to each of line cards 430. Each line card 430 performs an independent lookup of a destination address for each IP packet received on a local copy of the forwarding table. If the destination address is found in the forwarding table, the IP packet is automatically switched across switch fabric 410 to the destination line card. Line cards 430 connect router 400 to other devices on the network via electrical or optical media. Line cards 430 typically transmit IP packets over DPT, PPP, Frame Relay, or ATM interfaces. The specific features and functions of line cards 430 are typically interface specific.

When an IP packet is received by a line card 430, line card 430 performs a lookup in its forwarding table of the destination address located in the IP packet. If the destination address is in the forwarding table, the IP packet is automatically forwarded or switched across switch fabric 410 to the destination line card. If the destination address is not in the forwarding table, route processor 420 must calculate the best path for the IP packet across the network, update the routing table and distribute and update the forwarding tables on line cards 430. The use of forwarding tables on line cards 430 saves significant processing overhead for the processing engine(s) on route processor 420.

Router 400 is an exemplary diagram of a typical router. A router can have many different configurations and implementations. Other router configurations may be used without departing from the present invention. For example, in an alternate embodiment of router 400, line cards 430 contain one or more processing engines that perform routing functions. If the destination address of a received IP packet is not in line card 430's forwarding table, the processing engine(s) on line card 430 must calculate the best path for the IP packet across the network and update the forwarding table. In this embodiment, the use of forwarding tables save significant processing overhead for the processing engine(s) on line card 430.

Router 400 can be configured and enabled to collect network data. To collect network data, the processing engine(s) in route processor 420 or line card 430 must process each IP packet travelling through router 400 to collect network data. Routers and switches can be enabled to collect network traffic data, for example, by monitoring and tracking for various fields within IP packets such as source address, destination address, protocol, type of service (ToS), and the like. Traffic flows can also be monitored. Traffic flows are unidirectional sequences of packets between a particular source device and destination device that share the same protocol and transport-layer information. Because of their unidirectional nature, flows from a client to a server are differentiated from flows from the server to the client. Flows are also differentiated on the basis of protocol. For example, Hypertext Transfer Protocol (HTTP) Web packets from a particular source host to a particular destination host constitute a separate flow from File Transfer Protocol (FTP) file transfer packets between the same pair of hosts. In addition to monitoring control information fields in an IP packet, network data such as the number of packets in the flow, the total number of bytes in a flow, first and last time stamps of packets that were switched as part of a flow, etc. can be collected. Traffic records are often kept in a table coupled to the processing engine(s). During the processing of packets and monitoring the flows, in one implementation the processing engine(s) can determine if the packet is part of one or more recorded traffic flows. The processing engine(s) create a new entry in the table if the packet is not part of one of the recorded flows or already recorded. The processing engine(s) increment information in a field in an existing entry in the table if the packet is part of an already recorded traffic flow or already recorded information. The processing engine(s) can also time stamp packets in the flow and perform other traffic monitoring activities. Although traffic flows have been described in detail here, any type of traffic data or packet monitoring can be implemented.

The captured traffic data can be used for a wide variety of purposes, such as network analysis and planning, network management, accounting, billing, and data mining. Network data records contain detailed traffic information pertaining to traffic flows between communicating end nodes in a network. Such information includes data regarding Layer 3 source and destination nodes, down to the level of the application port numbers and the protocols used by the communicating end nodes. Network data collection enables network managers to monitor network traffic, determine bandwidth requirements, ensure quality of service (QoS) compliance, and fine-tune network performance. In addition, traffic data collection enables traffic information to be consolidated and used for billing purposes on a per-application or usage basis. Data collection applications can typically provide time-based, granular data measurements to external applications. Traffic accounting details gathered can be used in the areas of network planning, accounting/billing and network and application resource monitoring.

Network nodes such as router 400 can be configured for network data collection. Traffic data for each active flow are maintained in a table and are incremented when packets within each flow are switched. Periodically, summary traffic data are exported from the network device by means of traffic information packets, such as traffic information packet 500 described in FIGS. 5A–5C. Network management collection applications receive and process the traffic information packets. These traffic information packets can be exported from network nodes once every second, or even more frequently and can be user configurable. Network data collection can be configured on a per-node basis.

In alternate embodiments, traffic information packets may not be exported. In such an implementation, data can be gathered by reading from the tables directly. In alternate embodiments, only a portion of the traffic information packets can be exported.

FIG. 5A illustrates an exemplary traffic information packet format 500 in which network traffic data can be exported from routers, switches and other communications equipment. Traffic information packet 500 consists of a header 510 and one or more flow records 515.

FIG. 5B illustrates an exemplary traffic information packet header format 510. A version field 521 contains the version number of the traffic information packet. A count field 522 indicates the number of flow records in the traffic information packet (indicating the number of expired flows represented by the datagram) and is used to index through the flow records. A system up time field 523 indicates the current time in milliseconds since the export device booted. A seconds field 524 indicates a measurement of time in seconds, for example, the number of seconds since a particular event. A nseconds field 525 indicates a measurement of time in nanoseconds, for example, the number of nanoseconds since a particular event. A flow sequence field 526 indicates the sequence counter of total flows seen. An engine type field 527 indicates the type of flow switching engine. An engine ID field 528 indicates the ID number of the flow switching engine. A pad field 529 is available for future expansion. Traffic information packet header format 510 is an exemplary structure; some or all of these fields may be present, in addition to others.

FIG. 5C illustrates an exemplary traffic information packet flow record format 515. One traffic information packet flow record is maintained for each flow. A source IP address field 531 indicates the source IP address of the flow, or, in the case of destination-only flows, the field is set to zero. A destination IP address field 532 indicates the destination address of the flow. A next hop field 533 indicates the IP address of the next hop router. An input field 534 indicates the SNMP index of the input interface. An output field 535 indicates the SNMP index of the output interface. A number of packets field 536 indicates the number of packets in the flow. A number of layer 3 bytes field 537 indicates the total number of layer 3 bytes in the packets of the flow. A first field 538 indicates the system up time at the start of the flow. A last field 539 indicates the system up time at the time the last packet of the flow was received. A source port field 540 indicates the TCP/UDP source port number or equivalent. A destination port field 541 indicates the TCP/UDP destination port number or equivalent. A pad field 542 is available for future expansion. A TCP flags field 543 indicates the TCP flags. A protocol field 544 indicates IP protocol type (for example, TCP=6, UDP=17). A type of service (TOS) field 545 indicates IP type of service. A source AS field 546 indicates the source autonomous system number, either origin or peer. A destination AS field 547 indicates destination autonomous system number, either origin or peer. A source mask field 548 indicates the source address prefix mask. A destination mask field 549 indicates the designation address prefix mask. A pad field 550 is available for future expansion. Traffic information packet flow record format 515 is an exemplary structure; some or all of these fields may be present, in addition to others.

Network traffic data is collected while the routers and switches perform their switching functions. The network node's processing engine(s) perform table management functions such as determining if a packet is part of an existing traffic flow or if the packet should generate a new table entry, dynamically updating the per-flow data in the table, determining the aging, idleness, and storage limits of flows, time stamping the first and last packets in a flow, and creating, updating and transmitting traffic information packets. Forwarding tables are included in network nodes to reduce processing engine(s) processing overhead. However, when network traffic monitoring functions are enabled, the network node's processing engine(s) must process all IP packets, causing reduced flow of packets through the network node. Methods to improve throughput have been limited to reducing the number of control fields monitored or simply turning off network traffic monitoring by the network node.

A new method of collecting network traffic data is now described. Instead of processing every IP packet by the processing engine(s) on a network node, a statistical sample of the IP packets being forwarded are sent to the processing engine(s). For example, sampling algorithms such as linear (such as once every N packets), exponential (such as once every $2^N$ packets), natural log (such as once every logN packets), or burst (such as the next 100 packets) can be used as a collection algorithm. In addition, a traffic attribute scheme can be used. For example, a filter is used that only identifies packets with a specific destination address. A sampling mode and sampling rate can be defined by the network node operator. For example, a network node operator can configure the network node data collection to be linear and to sample one out of every 10 IP packets.

FIG. 6 illustrates sampled network data fields according to an embodiment of the invention. A sampling mode field 610 is typically two bits long and indicates the sampling mode, such as linear, exponential, natural log and burst. A sampling interval field 615 is typically 14 bits long and indicates the sampling interval, providing up to 16384 possible intervals. These fields 610 and 615 are typically located in the header 510 of traffic information packet 500 in unused fields, such as pad field 529. An example configuration for router 400 would be to set the first two bits, the sampling mode, to "01" (representing packet interval) and the next 14 bits, the sampling interval, to a value between 10 and 16382. Setting the sampling interval of all zeroes would turn off the sampling function. Sampling intervals not defined can be reserved for future implementations.

According to the sampling data collection technique described above, the sample mode and sample rate is reported in each traffic information packet. The collection application, such as NetFlow Flow Collector from Cisco Systems, Inc. of San Jose, Calif., can extrapolate the data that is being exported from the router from the sample mode and sample rate.

Figure 7:
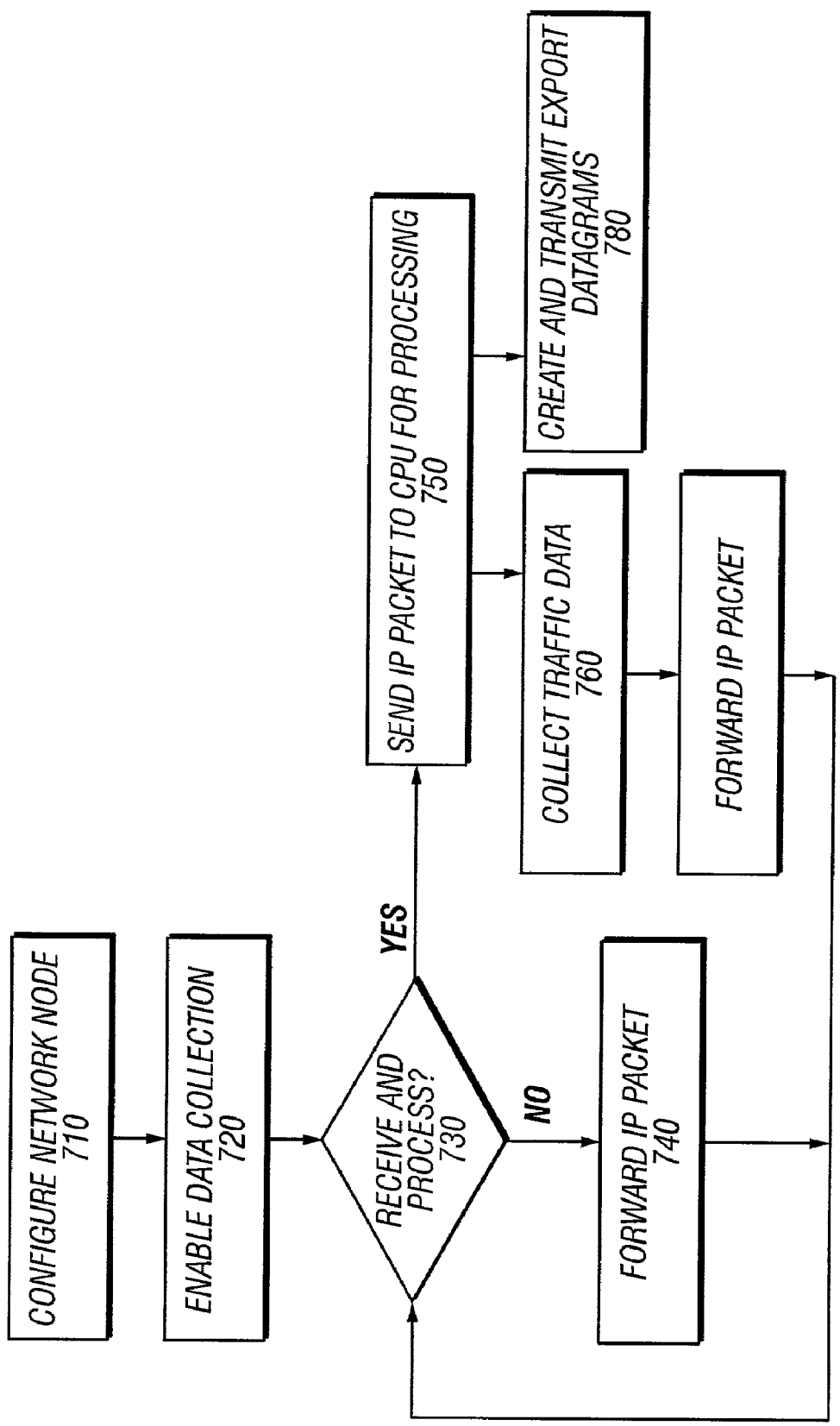
FIG. 7 illustrates a flow diagram of network data collection according to an embodiment of the present invention.

FIG. 7 illustrates a flow diagram of network data collection according to an embodiment of the present invention. The communications equipment or network node is configured to collect network traffic data (step 710). This includes identifying IP packet control fields to be monitored, determining the sample mode and sample rate, etc. Next, the collection of network traffic data is enabled (step 720). IP packets are received and a determination is made according to the sample mode and sample rate whether the received IP packet is to be processed for network traffic data collection (step 730). If the IP packet is not to be processed for network traffic data collection, it is automatically forwarded to a destination line card (step 740). Note that if the IP packet destination address is not in the line cards forwarding table, the processing engine(s) on the line card or the route processor must determine the routing. The processing engine(s) collect network traffic data from the IP packet and forward the IP packet to the destination line card, step 750. In addition, as a background process, during the processing of packets, the processing engine(s) create traffic information packets and optionally forward them to the network traffic data collection application, step 760.

In alternate embodiments, traffic information packets are not created and/or forwarded to the network traffic data collection application. In such an implementation and the implementation described in FIG. 7, traffic data can be directly read from the table entries.

The present invention alleviates a processing engine(s) from having to process all IP packets being forwarded through the network node. The processing engine(s) process only a sample or percentage of the IP packets, significantly reducing processing engine overhead.

The present invention also leverages the existing format of traffic information packets, ensuring that the exported data is backward compatible with older collection applications. The present invention can be implemented on any device that supports existing traffic information packet formats. An advantage of the present invention is that data integrity is not lost when used for activities like capacity planning, sales and marketing, and traffic engineering. Fairly sampled data accurately represents network traffic.

The present invention supports alternate embodiments. For example, although Internet Protocol (IP) packet flows have been described in detail in an embodiment of the invention, those skilled in the will art realize that protocols and flows other than IP, such as IP version 6, Multi-Protocol Label Switching (MPLS), those at other layers of the OSI Reference Model, and others can be benefit from the present invention and its alternate embodiments. Accordingly, the invention is not limited to any particular type of protocol or packet format.

In addition, although the terms router and/or switch are used generally in this specification, those skilled in the art will realize that other related networking devices may be used, in addition to routers or switches, to perform analogous functions. Accordingly, the invention is not limited to any particular type of networking device, router, or switch. For example, a router may direct an information packet based on address information contained within the packet. However, embodiments of the present invention are not limited to use in a router, but may be used at any point in a network. Thus, the term "network" as used herein is to be broadly construed to mean any communication system in which carried information has a characteristic subject to monitoring.

Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method comprising:
   collecting network traffic data wherein said collecting comprises
   receiving a group of information,
   determining whether to process the group of information for network traffic data collection, wherein
   said determining is performed according to one of a plurality of sampling algorithms,
   processing the group of information for network traffic data collection if the determination is to process the group of information, wherein the processing further comprises:
      creating a traffic information packet, wherein the traffic information packet includes a sampling mode field indicating the sampling algorithm used; and
      transmitting the traffic information packet to a network traffic data collection application; and
   forwarding the group of information to a destination.

2. The method of claim 1 wherein the group of information is an IP packet.

3. The method of claim 1 wherein forwarding the group of information to the destination comprises:
  identifying the destination using a forwarding table;
  if the destination is in the forwarding table, automatically forwarding the group of information to the destination; and
  otherwise sending the group of information to one or more processing engines to determine routing to the destination and forwarding the group of information according to the determined routing.

4. The method of claim 1 wherein forwarding the group of information to the destination is performed after processing the group of information.

5. The method of claim 1 wherein the processing of the group of information for network traffic data collection comprises:
  determining if the group of information is part of one or more recorded traffic flows;
  creating a new entry in a table if the group of information is not part of the one or more recorded traffic flows;
  incrementing a field in an existing entry in the table if the group of information is part of the one or more recorded traffic flows; and
  time stamping the group of information.

6. The method of claim 1 wherein the traffic information packet comprises a header and one or more flow records.

7. An apparatus comprising:
  means for receiving a group of information; and
  means for collecting network traffic data said means for collecting comprising
  means for determining whether to process the group of information for network traffic data collection, wherein the means for determining comprises a means for sampling,
  means for processing the group of information for network traffic data collection if the determination is to process the group of information, wherein the means for processing further comprises:
    a means for creating a traffic information packet, wherein the traffic information packet includes a sampling mode field indicating one of a plurality of sampling algorithms used; and
    a means for transmitting the traffic information packet to a network traffic data collection application; and
  means for forwarding the group of information to a destination.

8. The apparatus of claim 7 wherein the group of information is an IP packet.

9. The apparatus of claim 7 wherein the means for forwarding the group of information to the destination comprises:
  means for identifying the destination using a forwarding table;
  means for automatically forwarding the group of information to the destination if the destination is in the forwarding table; and
  means for sending the group of information to one or more processing engines to determine routing to the destination and then forward the group of information according to the determined routing otherwise.

10. The apparatus of claim 7 wherein the means for processing of the group of information for network traffic data collection comprises:
  means for determining if the group of information is part of one or more recorded traffic flows;
  means for creating a new entry in a table if the group of information is not part of the one or more recorded traffic flows;
  means for incrementing a field in an existing entry in the table if the group of information is part of the one or more recorded traffic flows; and
  means for time stamping the group of information.

11. The apparatus of claim 7 wherein the traffic information packet comprises a header and one or more flow records.

12. A network node comprising:
  a processing engine, wherein
  the processing engine is configured to collect network traffic data; and
  a memory coupled to the processing engine and the memory is configured to store instructions configured to cause the processing engine to
  receive a group of information;
  determine whether to process the group of information for network traffic data collection according to one of a plurality of sampling algorithms;
  process the group of information for network traffic data collection if the determination is to process the group of information;
  create a traffic information packet, wherein the traffic information packet includes a sampling mode field indicating the sample algorithm used;
  transmit the traffic information packet to a network traffic data collection application; and
  forward the group of information to the destination.

13. The network node of claim 12 wherein the group of information is an IP packet.

14. The network node of claim 12 wherein the set of instructions to forward the group of information to the destination comprises a set of instructions to:
  identify the destination using a forwarding table;
  if the destination is in the forwarding table, automatically forward the group of information to the destination; and
  otherwise send the group of information to one or more processing engines to determine routing to the destination and forward the group of information according to the determined routing.

15. The network node of claim 12 wherein the set of instructions to process the group of information for network traffic data collection comprises a set of instructions to:
  determine if the group of information is part of one or more recorded traffic flows;
  create a new entry in a table if the group of information is not part of the one or more recorded traffic flows;
  increment a field in an existing entry in the table if the group of information is part of the one or more recorded traffic flows; and
  time stamp the group of information.

16. The network node of claim 12 wherein the traffic information packet comprises a header and one or more flow records.

17. A router comprising:
  one or more switch fabrics;
  one or more destination line cards coupled to the one or more switch fabrics;
  a source line card coupled to one of the one or more switch fabrics, wherein
  the source line card receives a data packet;
  a router processor, coupled to the switch fabric, and configured to determine whether to process the data packet for network traffic data collection according to one of a plurality of sampling algorithms;

process the data packet for network traffic data collection if the determination is to process the data packet;

create a traffic information packet, wherein the traffic information packet includes a sampling mode field indicating the sample algorithm used;

transmit the traffic information packet to a network traffic data collection application; and forward the data packet to one of the one or more destination line cards.

18. The router of claim 17 wherein the data packet is an IP packet.

19. The router of claim 17 wherein the router processor is further configured to select the sample algorithm from one of linear sampling exponential sampling, natural log sampling, burst sampling, and selecting the data packet based on an examination of traffic attribute data in the data packet.

20. The router of claim 17 wherein to forward the data packet to one of the one or more destination line cards, the source line card is configured to:

identify the one of the one or more destination line cards using a forwarding table;

if the one of the one or more destination line cards is in the forwarding table, automatically forward the data packet to the one of the one or more destination line cards; and otherwise send the data packet to the router processor wherein the router processor is configured to determine routing to one of the one or more destination line cards, and then forward the data packet according to the determined routing.

21. The router of claim 20 wherein the router processor is located on the source line card.

22. The router of claim 17 wherein to process the data packet for network traffic data collection, the source line card is configured to:

determine if the data packet is part of one or more recorded traffic flows;

create a new entry in a table if the data packet is not part of the one or more recorded traffic flows;

increment a field in an existing entry in the table if the data packet is part of the one or more recorded traffic flows; and time stamp the data packet.

23. The router of claim 17 wherein the traffic information packet comprises a header and one or more flow records.

24. The method of claim 1 wherein said collecting further comprises:

selecting the sampling algorithm, wherein the sampling algorithm is one of a linear, an exponential, a natural log, and a burst sampling algorithm, and examination of traffic attribute data in the group of information.

25. The apparatus of claim 7 wherein the means for determining further comprises:

means for selecting the means for sampling from one of
a means for linear sampling,
a means for exponential sampling,
a means for natural log sampling,
a means for burst sampling, and
a means for examining traffic attribute data in the group of information.

26. The network node of claim 12 having the memory further configured to store instructions to select the sample algorithm from one of a linear sampling algorithm,
an exponential sampling algorithm,
a natural log sampling algorithm,
a burst sampling algorithm, and
selecting the group of information based on an examination of traffic attribute data in the group of information.

27. The network node of claim 12 wherein the network node further comprises:

a plurality of processing engines, wherein
the plurality of processing engines comprise the processing engine.

28. The method of claim 1 wherein the traffic information packet includes a sampling interval field.

29. The apparatus of claim 7 wherein the traffic information packet includes a sampling interval field.

30. The network node of claim 12 wherein the traffic information packet includes a sampling interval field.

31. The router of claim 17 wherein the traffic information packet includes a sampling interval field.

* * * * *